US012291036B2

(12) United States Patent
Tsuji et al.

(10) Patent No.: US 12,291,036 B2
(45) Date of Patent: May 6, 2025

(54) LIQUID EJECTION HEAD AND LIQUID EJECTION APPARATUS

(71) Applicant: CANON KABUSHIKI KAISHA, Tokyo (JP)

(72) Inventors: Tomoki Tsuji, Kanagawa (JP); Yumi Komamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 17/944,626

(22) Filed: Sep. 14, 2022

(65) Prior Publication Data

US 2023/0098540 A1 Mar. 30, 2023

(30) Foreign Application Priority Data

Sep. 29, 2021 (JP) ................................ 2021-159538

(51) Int. Cl.
*B41J 2/175* (2006.01)

(52) U.S. Cl.
CPC ................................ *B41J 2/17523* (2013.01)

(58) Field of Classification Search
CPC ...... B41J 2/17523; B41J 2/14; B41J 2202/08; B41J 2202/12; B41J 2202/20; B41J 2/18; B41J 2/175
USPC ........................................................... 347/85
See application file for complete search history.

(56) References Cited

U.S. PATENT DOCUMENTS

2008/0211867 A1 9/2008 Komura
2017/0341391 A1* 11/2017 Mori .................... B41J 2/1433

FOREIGN PATENT DOCUMENTS

JP 2017-013514 A 1/2017
JP 2017-209895 A 11/2017

OTHER PUBLICATIONS

Notification of Reasons for Refusal dated Aug. 8, 2023, in Japanese Patent Application No. 2021-159538.

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

A liquid ejection head and liquid ejection apparatus are capable of suppressing deterioration in image quality without adding a member for heat radiation. In the liquid ejection head that ejects a circulating liquid, an engagement part formed on the discharge port side has an elongated hole shape extending in a direction so as to support a liquid ejection unit support member in such a manner as to allow thermal deformation.

10 Claims, 11 Drawing Sheets

LIQUID EJECTION HEAD AND LIQUID EJECTION APPARATUS

BACKGROUND OF THE INVENTION

Field of the Invention

The present invention relates to a liquid ejection head and liquid ejection apparatus that eject a circulating liquid.

Description of the Related Art

In a liquid ejection head that ejects a circulating liquid, the liquid supplied from the outside of the liquid ejection head through a supply port flows through a common flow path to be ejected from an ejection port of a print element substrate via an individual flow path. The circulating liquid that is not ejected is discharged from the common flow path to the outside of the liquid ejection head via a discharge port.

At the time of ejection, the heat generated in the print element substrate and a drive element is transferred to the liquid flowing in the flow paths and transferred to the flow paths via the liquid, so that heat is accumulated on the discharge side of the flow path member in the liquid ejection head. On the other hand, since the liquid supplied from the supply port is a temperature-controlled liquid, the supply side is not affected by the heat generated in the print element substrate and the drive element. Therefore, the temperature on the discharge side of the flow path member is higher than that on the supply side. As a result, there has been a risk that the printed image quality will deteriorate due to thermal deformation of a member in the liquid ejection head.

Japanese Patent Laid-Open No. 2017-13514 discloses a configuration in which heat is radiated by use of a heat sink that radiates heat generated in a drive circuit or a heat pipe in which a refrigerant is sealed in order to prevent thermal deformation of a support member in the liquid ejection head.

The method of Japanese Patent Laid-Open No. 2017-13514 has a problem that the liquid ejection head becomes large and costly due to an increase of components such as a heat sink and a heat pipe.

SUMMARY OF THE INVENTION

Accordingly, the present invention provides a liquid ejection head and liquid ejection apparatus capable of suppressing deterioration in image quality without adding a member for heat radiation.

Therefore, the liquid ejection head of the present invention includes: a flow path member including an element substrate equipped with a plurality of ejection ports that eject a liquid and a common flow path capable of supplying the liquid to the element substrate and is installed along the element substrate arranged in a first direction; and a support member that supports the flow path member and is equipped with a supply port capable of supplying the liquid in the common flow path and a discharge port capable of discharging the liquid from the common flow path, wherein, in the liquid ejection head, the liquid circulates via the supply port, the common flow path, and the discharge port, wherein, in the support member, the supply port is formed in the vicinity of one end, and the discharge port is formed in the vicinity of the other end, and wherein the support member includes a first fixation part that is installed in the vicinity of the one end to fix the one end to an apparatus and a second fixation part that is installed in the vicinity of the other end to fix the other end to the apparatus so as to be movable in the first direction.

According to the present invention, it is possible to provide a liquid ejection head and liquid ejection apparatus capable of suppressing deterioration in image quality without adding a member for heat radiation.

Further features of the present invention will become apparent from the following description of exemplary embodiments with reference to the attached drawings.

DESCRIPTION OF THE EMBODIMENTS

First Embodiment

Hereinafter, the first embodiment of the present invention will be explained with reference to the drawings.

Figure 1:
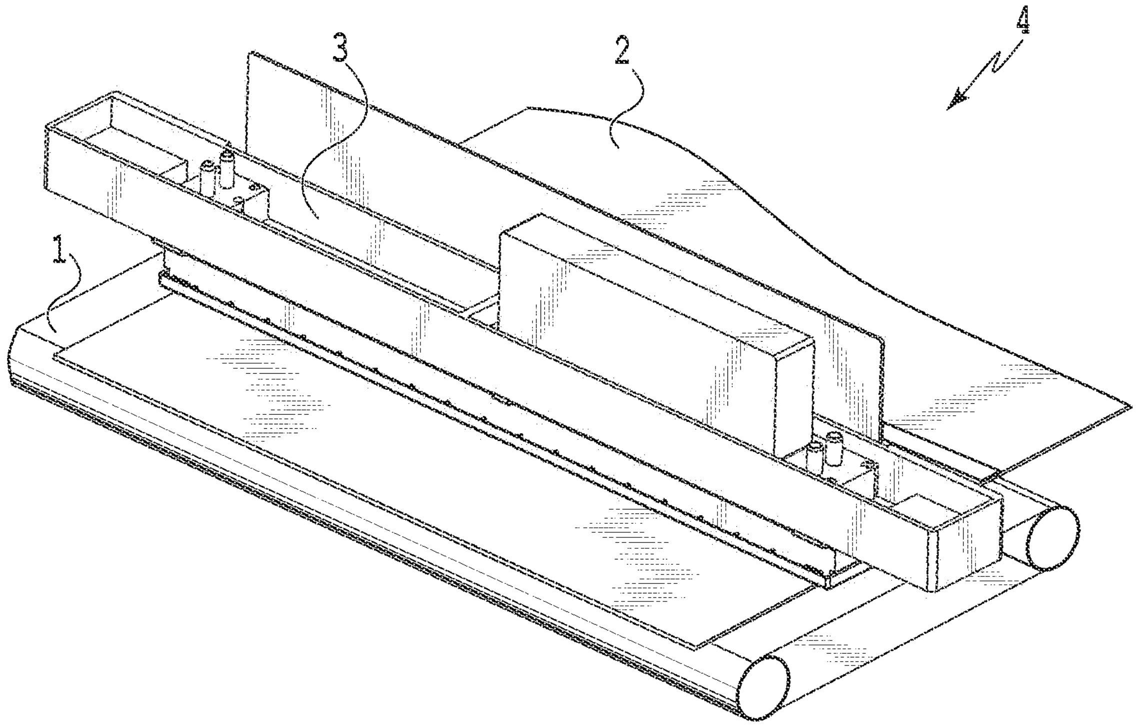
FIG. 1 is a schematic perspective view illustrating a liquid ejection apparatus.

FIG. 1 is a schematic perspective view illustrating the liquid ejection apparatus 4 to which the present embodiment can be applied. The liquid ejection apparatus 4 performs printing by ejecting liquid (hereinafter also referred to as ink) from the line-type liquid ejection head 3, which is arranged so as to be approximately orthogonal to the conveyance direction of the print medium 2, onto the print medium 2, which is conveyed by the conveyance part 1. The print medium 2 is not limited to a cut sheet and may be a continuous roll sheet. In the liquid ejection apparatus 4, the liquid ejection heads 3 for four monochromatic colors respectively corresponding to four types of inks, i.e., cyan C, magenta M, yellow Y, and black K, are arranged in the conveyance direction of the print medium 2, so that full color printing is performed.

Figure 2:
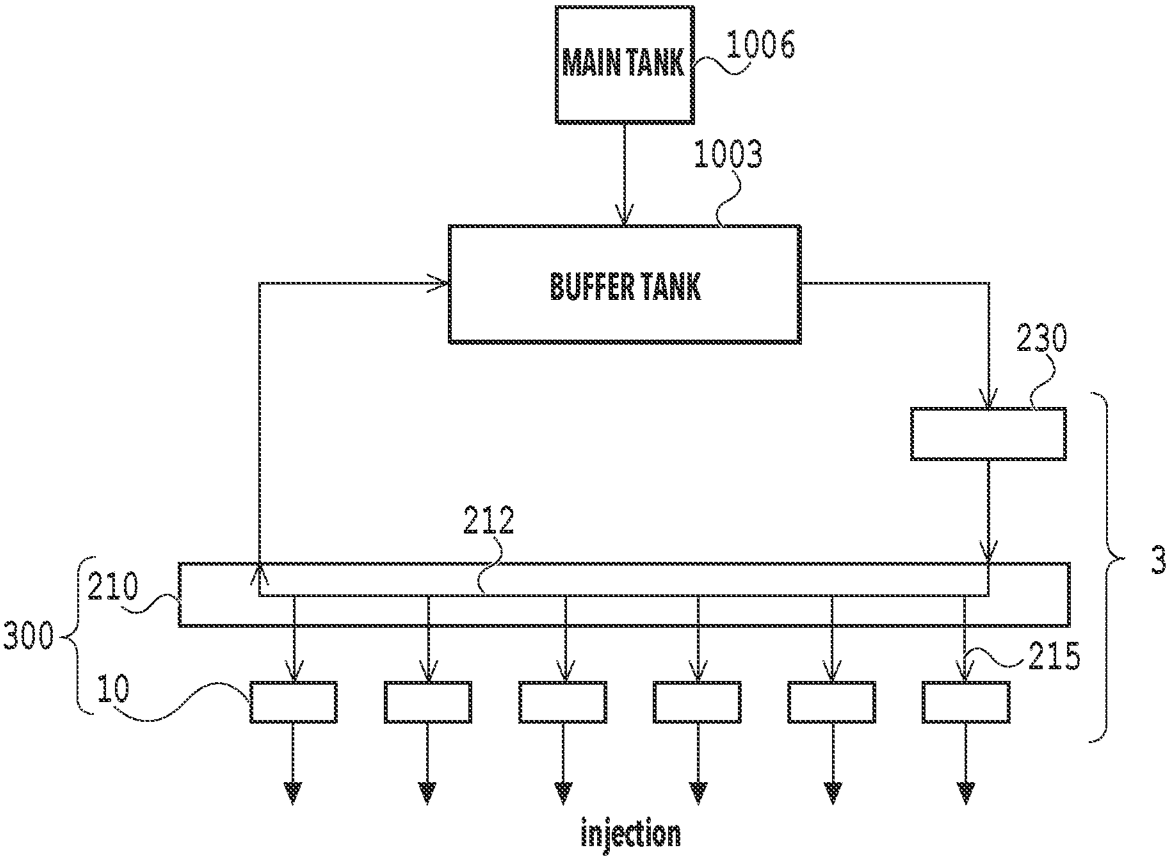
FIG. 2 is a schematic view illustrating a liquid circulation path applied to the liquid ejection apparatus.

FIG. 2 is a schematic view illustrating a liquid circulation path applied to the liquid ejection apparatus 4 of the present embodiment. Note that, in the illustration of FIG. 2, pumps or the like that circulate the liquid are omitted. The liquid ejection head 3 is fluidly connected to the buffer tank 1003 via a liquid supply unit, which is a supply path for supplying the liquid to the liquid ejection head 3, and the buffer tank 1003 is fluidly connected to the main tank 1006. Further, an electric control part (not illustrated in the drawings) for transmitting electric power and ejection control signals to the liquid ejection head 3 is electrically connected to the liquid ejection head 3.

The buffer tank 1003, which is a sub tank connected to the main tank 1006, has an atmosphere communication port (not illustrated in the drawings) that communicates the inside and the outside of the tank, and thus it is possible to discharge air bubbles in the ink to the outside. If the liquid is consumed by the liquid ejection head 3 for ejecting (discharging) ink from the ejection ports of the liquid ejection head, such as printing and suction recovery performed by ejecting ink, the consumed amount of ink will be transferred from the main tank 1006 to the buffer tank 1003.

When the liquid ejection unit 300 is driven, a certain amount of ink flows in the common flow path 212 by use of a pump (not illustrated in the drawings). The pressure-adjustment unit 230 is installed in the path between the buffer tank 1003 and the liquid ejection unit 300. The pressure-adjustment unit 230 maintains the pressure on the downstream side relative to the pressure-adjustment unit 230 (i.e., the liquid ejection unit 300 side) to a preset certain pressure even in a case where the flow rate of ink in the circulation system fluctuates due to a difference in the printing amount per unit area. In this way, in the liquid ejection unit 300, a liquid flow is generated in the common flow path 212.

The individual flow paths 215 are connected from the common flow path 212 to the respective print element substrates 10. A part of the ink flowing in the common flow path 212 flows to the print element substrates 10 to be ejected. Therefore, a part of the heat generated in each of the print element substrates 10 can be discharged to the outside of the print element substrate 10 together with the ink.

Figure 3A:
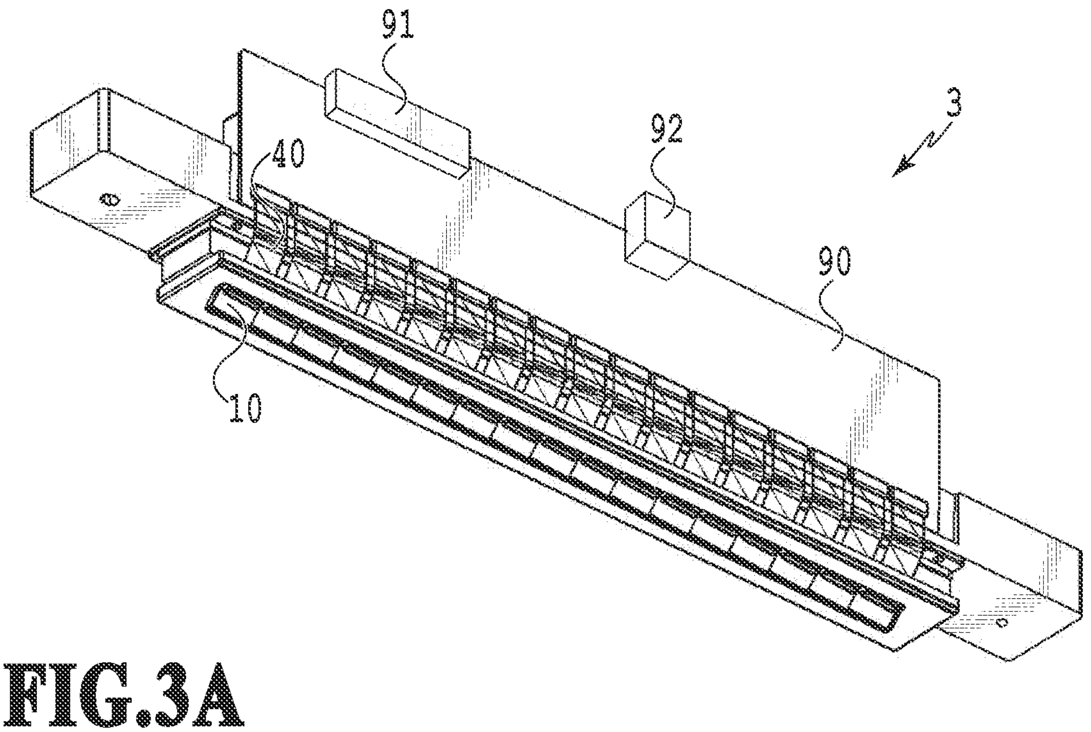
FIG. 3A is a perspective view illustrating a liquid ejection head.
Figure 3B:
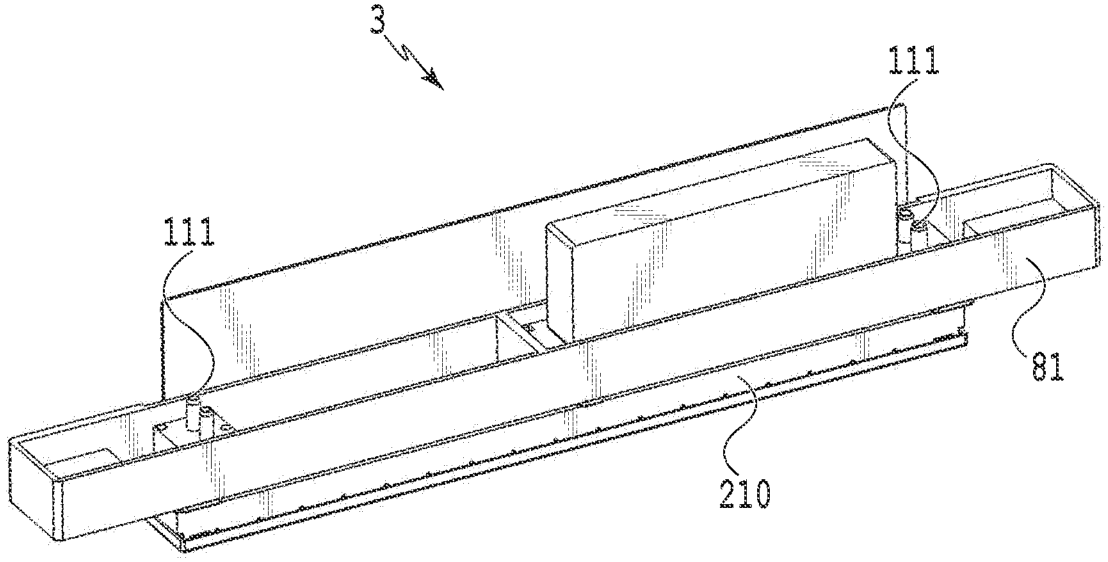
FIG. 3B is a perspective view illustrating the liquid ejection head.

FIG. 3A and FIG. 3B are perspective views illustrating the liquid ejection head 3 to which the present embodiment can be applied. FIG. 3A is a perspective view from below where the print element substrates 10 can be seen, and FIG. 3B is a perspective view from above where the liquid connection part 111 can be seen. The liquid ejection head is a line-type liquid ejection head with 15 print element substrates 10, each of which is capable of ejecting multiple colors of inks, being arranged in a straight line (arranged so as to be in-line). As illustrated in FIG. 3A, the liquid ejection head 3 is equipped with each print element substrate 10 as well as the signal input terminal 91 and the power supply terminal 92 that are electrically connected via the flexible wiring substrate 40 and the electrical wiring substrate 90.

The signal input terminal 91 and the power supply terminal 92 are electrically connected to the control part of the liquid ejection apparatus 4, so as to supply ejection drive signals and the power required for ejection to the print element substrates 10, respectively. By consolidating the wiring with the electric circuit in the electrical wiring substrate 90, the number of signal input terminals 91 and power supply terminals 92 is made to be less than the number of print element substrates 10. Accordingly, it is possible to reduce the work of removing electrical connection parts at the time of mounting the liquid ejection head 3 on the liquid ejection apparatus 4 or replacing the liquid ejection head 3.

As illustrated in FIG. 3B, the liquid connection parts 111 installed on both sides of the liquid ejection head 3 are connected to the liquid supply system of the liquid ejection apparatus 4. Accordingly, the ink is supplied from the supply system of the liquid ejection apparatus 4 to the liquid ejection head 3, and the ink that has passed through the liquid ejection head 3 is collected into the supply system of the liquid ejection apparatus 4. In this way, the ink circulates via the path of the liquid ejection apparatus 4 and the path of the liquid ejection head 3.

Figure 4:
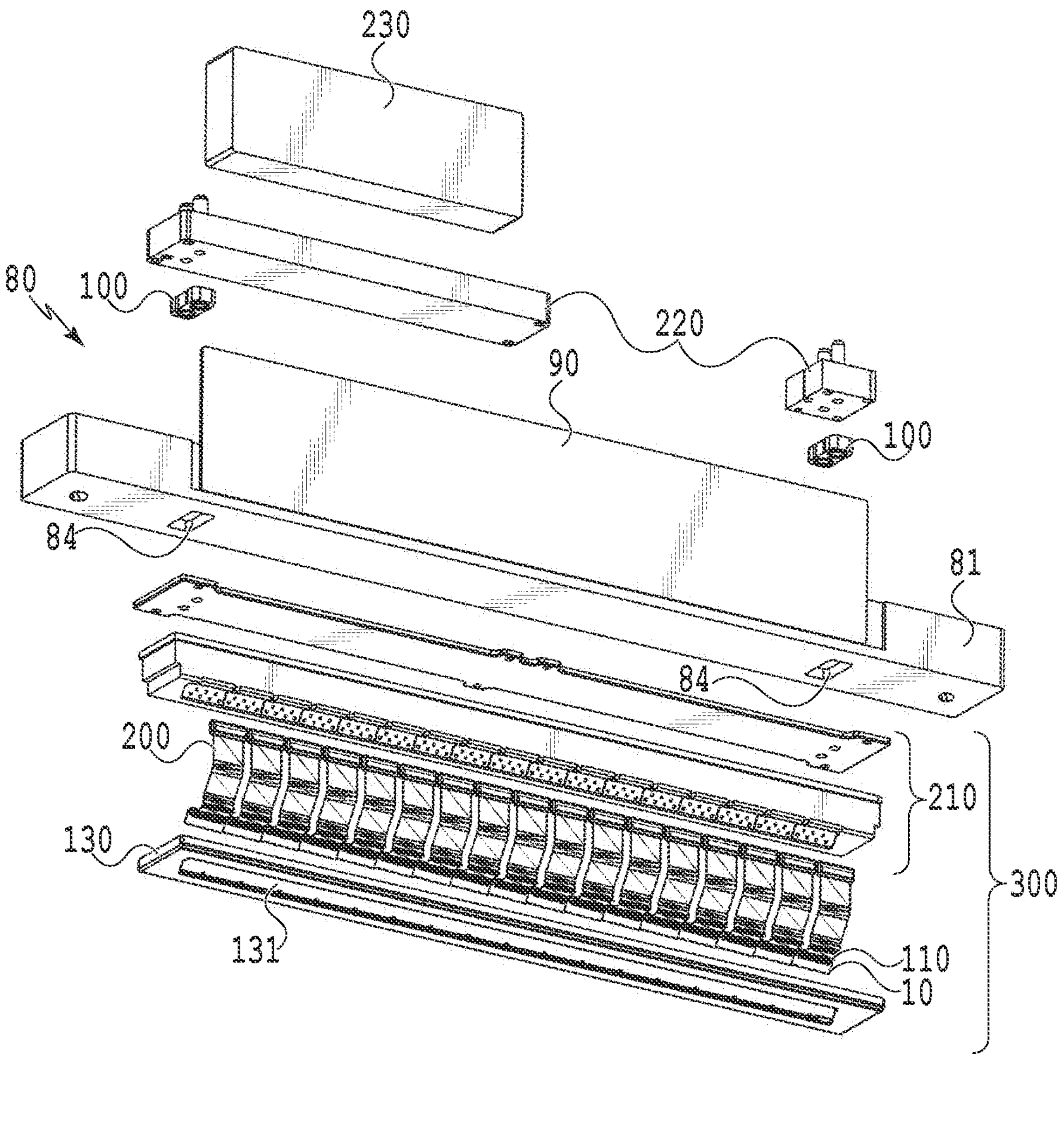
FIG. 4 is an exploded perspective view of the liquid ejection head.

FIG. 4 is an exploded perspective view of the liquid ejection head 3. In the liquid ejection head 3, the liquid ejection unit 300, the liquid supply unit 220, and the electrical wiring substrate 90 are attached to the case 80. The liquid supply unit 220 is equipped with the liquid connection part 111 (see FIG. 3B), and the inside of the liquid supply unit 220 is equipped with a filter that communicates with each opening of the liquid connection part 111 in order to remove foreign substances in the supplied ink. The liquid that has passed through the filter is supplied to the pressure-adjustment unit 230 which is arranged on the liquid supply unit 220.

The pressure-adjustment unit 230 includes a pressure-adjustment valve, and a valve, a spring member, etc., are installed inside. With the functions of the valve and the spring member, the pressure-adjustment unit 230 attenuates the change of the pressure drop in the supply system of the liquid ejection apparatus 4, which is caused by the fluctuation in the liquid flow rate, so that the negative pressure change on the downstream side relative to the pressure-adjustment unit 230 can be stabilized within a certain range. The pressure-adjustment unit 230 communicates with the common flow path 212 in the liquid ejection unit 300 and with the liquid supply unit 220.

The case 80 includes the liquid ejection unit support member 81, and the liquid ejection unit support member 81 supports the liquid ejection unit 300 and the electrical wiring substrate 90 and secures the rigidity of the liquid ejection head 3. The liquid ejection unit support member 81 is equipped with the opening 84 into which the joint rubber 100 is inserted. The liquid supplied from the liquid supply unit 220 is guided to the flow path member 210 of the liquid ejection unit 300 via the joint rubber 100.

The liquid ejection unit 300 includes the multiple ejection modules 200 and the flow path member 210, and the cover member 130 is attached to the liquid ejection unit 300 at the position facing the print medium. Here, the cover member 130 is a member having a frame-shaped surface equipped with the long opening 131, and the print element substrates 10 and the sealing material parts 110 included in the ejection modules 200 are exposed from the opening 131. The frame part around the opening 131 has a function as a contact surface of a cap member (not illustrated in the drawings) that caps the liquid ejection head 3 at the time on standby for printing. Therefore, it is preferable that an adhesive agent, a sealing material, a filler, or the like is applied along the periphery of the opening 131 to fill the unevenness and gap on the ejection port surface of the liquid ejection unit 300, so as to thereby form a closed space in the capped state.

Figure 5A:
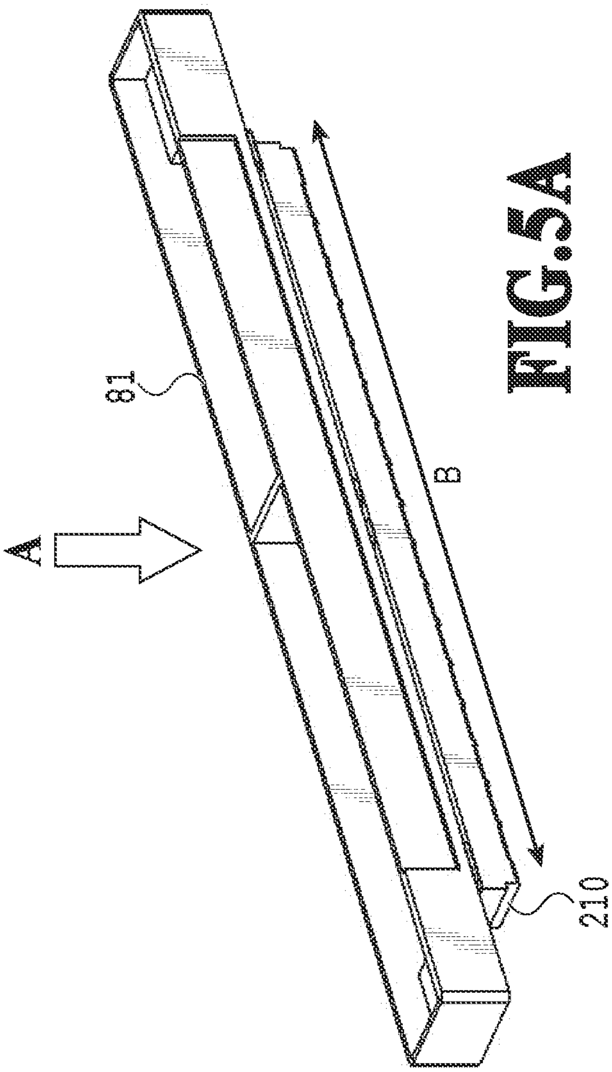
FIG. 5A is a diagram illustrating a liquid ejection unit support part.
Figure 5B:
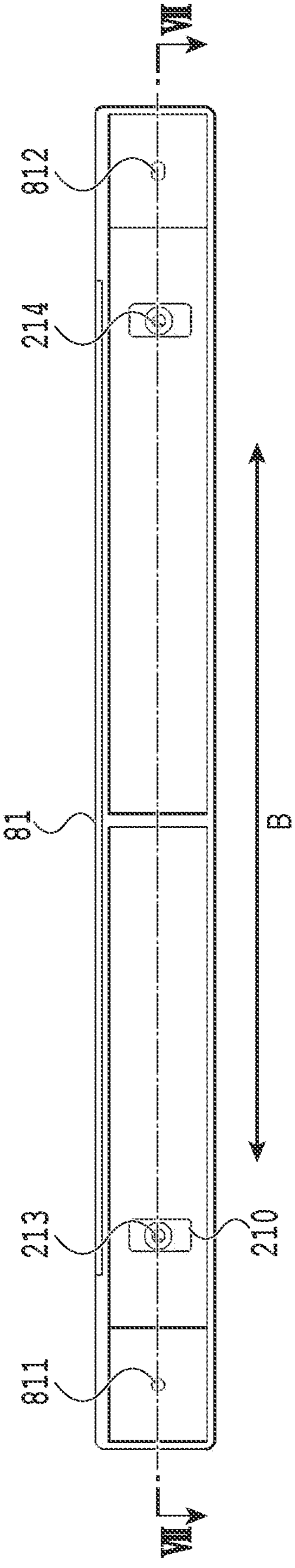
FIG. 5B is a diagram illustrating a flow path member.
Figure 6:
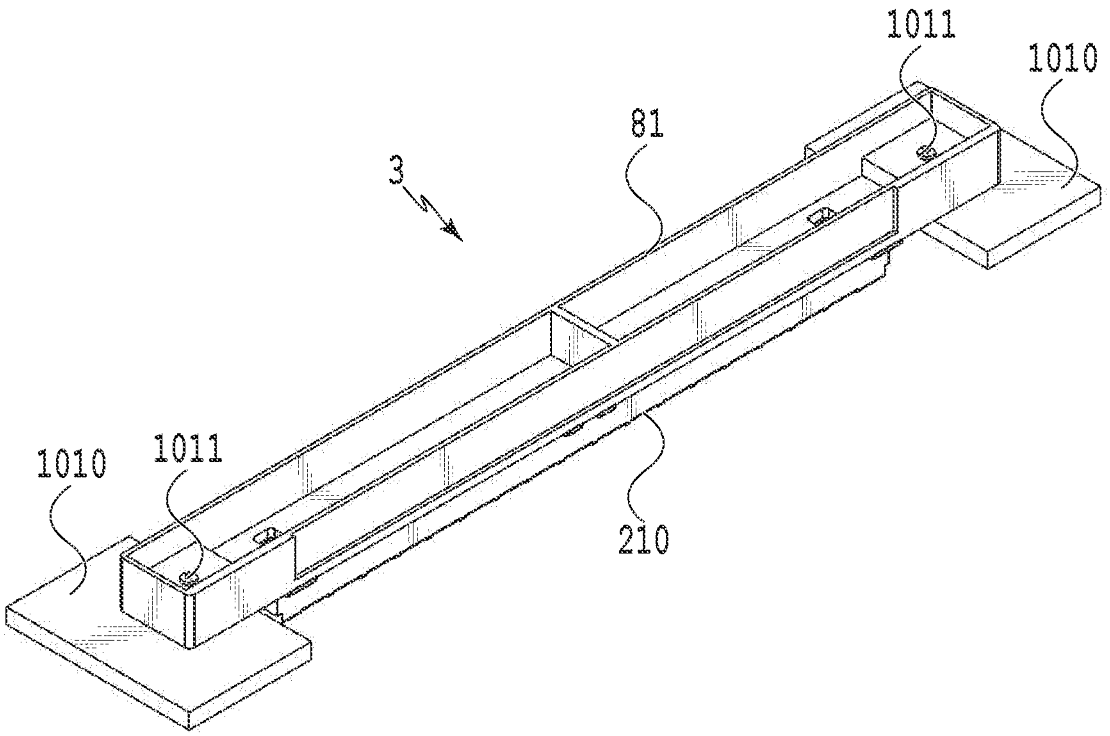
FIG. 6 is a perspective view illustrating the liquid ejection head fixed to a liquid ejection head holding part.

FIG. 5A is a perspective view of the liquid ejection unit support member 81 and the flow path member 210, and FIG. 5B is a diagram viewed along the arrow A of FIG. 5A. FIG. 6 is a perspective view illustrating the liquid ejection head 3 fixed to the liquid ejection head holding part 1010, in which some components are omitted. Hereinafter, a method of fixing the liquid ejection head 3 and the liquid ejection apparatus 4 will be explained.

The liquid ejection head 3 is fixed to the liquid ejection apparatus 4 by fixing an end of the liquid ejection unit support member 81 to the liquid ejection head holding part 1010 which is installed in the liquid ejection apparatus 4. As illustrated in FIG. 5B, the liquid ejection unit support member 81 has the first engagement part 811 (first fixation part) and the second engagement part 812 (second fixation part) for fixation to the liquid ejection head holding part 1010. The first engagement part 811 is a circular hole for positional fixation formed at one end of the liquid ejection unit support member 81, and the second engagement part 812 is a hole having an elongated hole shape extending in the arrow B direction, i.e., the width direction of the print medium, which is formed at the other end of the liquid ejection unit support member 81. Further, as illustrated in FIG. 6, in the liquid ejection head 3, the first engagement part 811 and the second engagement part 812, which are formed in the liquid ejection unit support member 81, and the engagement holes formed in the liquid ejection head holding parts 1010 are fastened with the fastening members 1011.

Here, the first engagement part 811 and the liquid ejection head holding part 1010 are fastened so as to be restrained with respect to the arrow B direction and serve as the reference position for aligning the liquid ejection head 3 and the center of the print medium in the arrow B direction. The second engagement part 812 and the liquid ejection head holding part 1010 are fastened so as to have such an engagement with a gap for the liquid ejection unit support member 81 to be movable in the arrow B direction. Accordingly, the liquid ejection head 3 to be mounted on the liquid ejection apparatus 4 can be easily attached, and, in addition, if a thermal expansion occurs to the liquid ejection head 3, the deformation in the arrow B direction is allowed and the warping in the direction orthogonal to the arrow B direction is prevented.

Further, the ejection center of the liquid ejection head 3 in the arrow B direction is the center position of the print element substrates 10 arranged from the first engagement part 811. That is, the first engagement part 811 serves as the reference position to determine the position of the print element substrate 10. The supply port 213 is formed in the vicinity of the first engagement part 811, and the discharge port 214 is formed in the vicinity of the second engagement part 812. Here, the vicinity indicates that the supply port 213 is formed at the end of the flow path member 210 on the same side as the one end of the liquid ejection unit support member 81 where the first engagement part 811 is formed. Further, it also indicates that the discharge port 214 is formed at the end of the flow path member 210 on the same side as the other end of the liquid ejection unit support member 81 where the second engagement part 812 is formed. The supply port 213 is formed so as to be capable of supplying the liquid to the flow path member 210, and the discharge port 214 is formed so as to be capable of discharging the liquid from the flow path member 210.

It is preferable that the first engagement part 811 is positioned on the outer side relative to the flow path member 210 in the arrow B direction and the second engagement part 812 is positioned on the outer side opposite to the first engagement part 811 in the arrow B direction. Accordingly, it is possible to reduce the amount of rotation of the liquid ejection head 3, which is caused by the positional deviation that occurs between the first engagement part 811 and the second engagement part 812 in the conveyance direction of the print medium that is orthogonal to the arrow B direction when the liquid ejection head 3 is attached to the liquid ejection apparatus 4.

Figure 7:
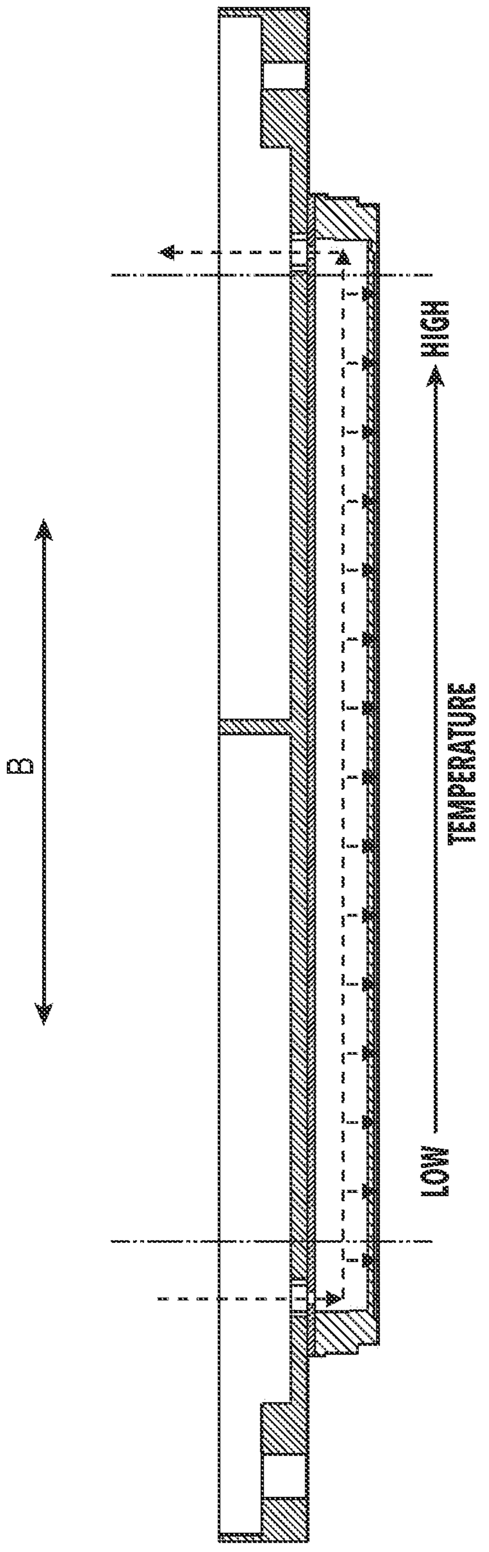
FIG. 7 is a cross-sectional view taken along the line VII-VII of FIG. 5B.

FIG. 7 is a cross-sectional view taken along the line VII-VII of FIG. 5B. With reference to FIG. 7, the thermal expansion of the liquid ejection unit support member 81, which is caused by the ink circulation of the flow path member 210 performed with the liquid ejection apparatus 4, will be explained. The flow path member 210 includes the common flow path 212, the flow path supply port 221, the flow path discharge port 222, and the individual flow paths 215. Further, the long dashed double-short dashed lines in FIG. 7 indicate the outermost positions in the arrow B direction among the ejection ports included in the arranged print element substrates 10. The liquid path in the flow path member 210 is a circulation path in which the liquid supplied from the liquid ejection apparatus 4 is supplied from the supply port 213 to the flow path member 210 via the flow path supply port 221 and discharged from the common flow path 212 to the discharge port 214 via the flow path discharge port 222 to return to the liquid ejection apparatus 4.

Further, the supply port 213 is positioned on the outer side relative to the outermost position of the ejection ports included in the print element substrates 10 arranged in the arrow B direction, and the discharge port 214 is also positioned on the outer side relative to the outermost position of the ejection ports on the opposite side of the first engagement part 811 in the arrow B direction. Accordingly, it is possible to improve the bubble removal property in the liquid circulation without forming a stagnation point in the common flow path 212 in the arrow B direction. Further, the ink is supplied from the common flow path 212 to the respective print element substrates 10 (see FIG. 3A and FIG. 4) through the individual flow paths 215.

As the liquid that enters the supply port 213 from the liquid ejection apparatus 4, the ink whose temperature is adjusted by the liquid ejection apparatus 4 to a certain temperature is supplied. When the liquid ejection head 3 ejects ink, the driving heat of the print element substrates 10 is generated. The generated heat is transferred to the liquid in the common flow path 212 through the individual flow paths 215. Since the liquid in the common flow path 212 flows from the supply port 213 to the discharge port 214, the heat transferred to the liquid in the common flow path 212 is accumulated on the discharge port 214 side, so that, in the common flow path 212, the temperature rises from the supply port 213 toward the discharge port 214. Further, such temperature distribution of the common flow path 212 is transferred to the liquid ejection unit support member 81. As a result, the temperature rises on the discharge port 214 side in the liquid ejection unit support member 81, so that thermal deformation occurs.

If the reference of the ejection center of the liquid ejection head 3 and the center position of the print medium 2 in the arrow B direction deviate from each other due to thermal deformation of the liquid ejection unit support member 81, the quality of image formation may deteriorate.

Therefore, in the present embodiment, the second engagement part 812 formed on the discharge port 214 side has an elongated hole shape extending in the arrow B direction so as to fix the liquid ejection unit support member 81 while allowing thermal deformation of the liquid ejection unit support member 81. Accordingly, it is possible to suppress the deviation of printed images, which is caused by thermal deformation of each member due to the driving heat of the print element substrates 10.

Hereinafter, details of thermal deformation of each member due to the driving heat of the print element substrates 10 will be explained.

Figure 8A:
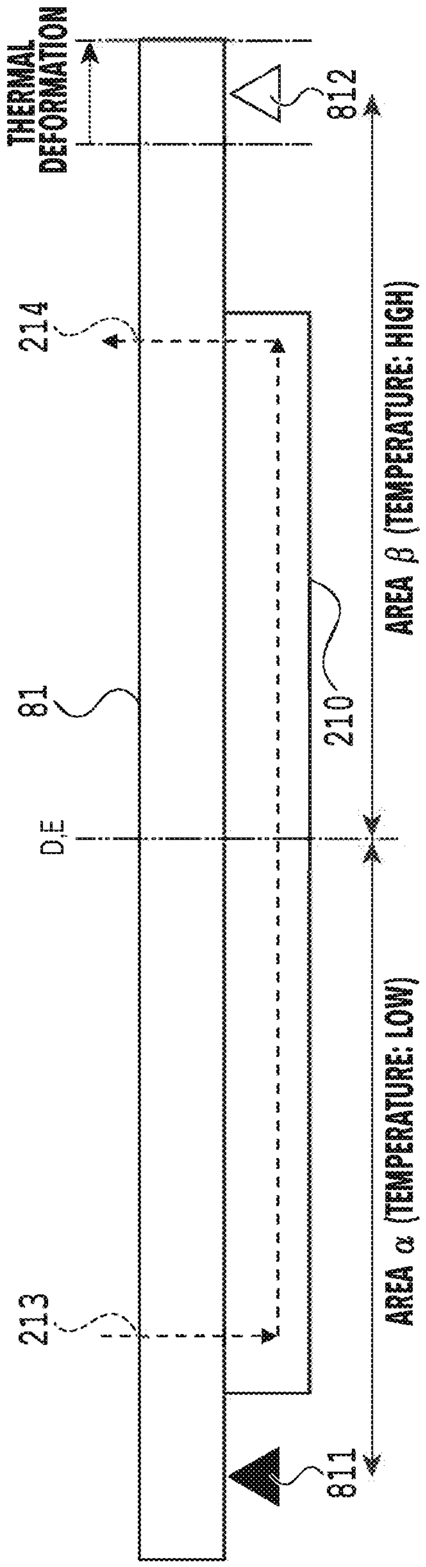
FIG. 8A is a schematic view illustrating the liquid ejection unit support part.
Figure 8B:
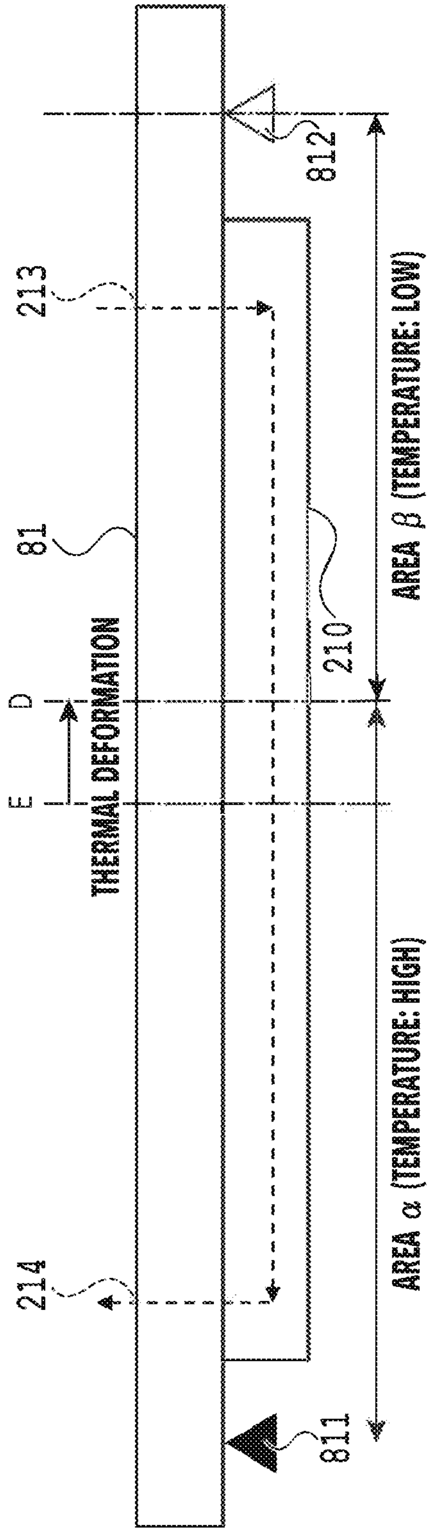
FIG. 8B is a schematic view illustrating the flow path member.

FIG. 8A is a schematic view illustrating the liquid ejection unit support member 81 and the flow path member 210 in the present embodiment, and FIG. 8B is a schematic view illustrating the liquid ejection unit support member 81 and the flow path member 210 of a comparative example. Note that, in both FIG. 8A and FIG. 8B, the center line D is the reference position of the ejection center of the liquid ejection head 3, and the center line E is indicative of the center position of the print medium 2 for which the reference is on the left side in the drawing. Further, the area α is from the first engagement part 811 of the liquid ejection unit support member 81 to the ejection center of the liquid ejection head, and the area β is from the ejection center of the liquid ejection head to the second engagement part 812.

As described above, with respect to the arrow B direction in the present embodiment, the supply port 213 is formed on the same side as the first engagement part 811 and the discharge port 214 is formed on the same side of the second engagement part 812 (see FIG. 8A). The area α, which is on the supply port side, is a low temperature area, and thus the influence of thermal deformation in the area α can be ignored. The area β, which is on the discharge port side, is a high temperature area, and thus thermal deformation occurs. However, even though thermal deformation occurs in the area β, the reference position D of the ejection center of the liquid ejection head and the center line E of the print medium 2 are not affected.

On the other hand, as illustrated in FIG. 8B, with respect to the arrow B direction, in a case where the discharge port 214 is formed on the same side as the first engagement part 811 and the supply port 213 is formed on the same side as the second engagement part 812, the area α is a high temperature area, so that thermal deformation occurs. Therefore, the reference position D of the ejection center of the liquid ejection head and the center line E of the print medium 2 deviate from each other. As a result, the quality of printed images deteriorates.

As in the present embodiment, with respect to the arrow B direction, the supply port 213 is formed on the same side as the first engagement part 811 and the discharge port 214 is formed on the same side as the second engagement part 812. Accordingly, printing can be performed without causing a deviation between the reference position D of the ejection center of the liquid ejection head and the center position E of the print medium 2.

Figure 9:
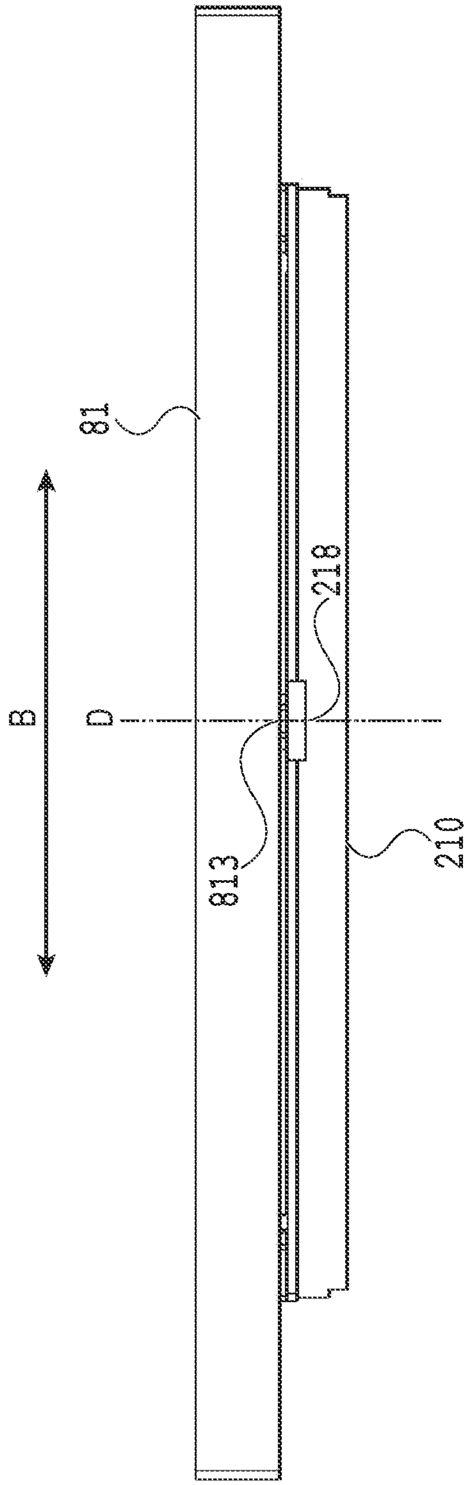
FIG. 9 is a schematic view illustrating the liquid ejection unit support part and the flow path member.

FIG. 9 is a schematic view illustrating the liquid ejection unit support member 81 and the flow path member 210 in the present embodiment. In the present embodiment, as illustrated in FIG. 9, the flow path member 210 is attached to the liquid ejection unit support member 81 at the center of the flow path member 210 in the arrow B direction. Since the print element substrates 10 are installed evenly on the left and right sides, even if thermal deformation occurs, the flow path member 210 itself is deformed evenly on the left and right sides with respect to the arrow B direction. Therefore, even if thermal deformation occurs to the flow path member 210 due to the driving heat of the print element substrates 10 for printing, the thermal deformation occurs symmetrically to the left and right sides of the reference position D of the ejection center of the liquid ejection head, and thus it is possible to prevent positional deviation of the ejection center position of the liquid ejection head 3.

In this way, according to the configuration of the liquid ejection head 3 of the present embodiment, it is possible to suppress the deviation between the reference position D of the ejection center of the liquid ejection head and the center position E of the print medium 2 as well as the positional deviation of the ejection center position of the liquid ejection head 3. As a result, deterioration in the quality of images to be printed can be suppressed.

Note that, although the first engagement part 811 and the second engagement part 812 of the liquid ejection unit support member 81 and the engagement holes of the liquid ejection head holding parts 1010 are fastened with the fastening members 1011 in the present embodiment, there is not a limitation as such. For example, such a structure in which the liquid ejection unit is equipped with the first protrusion part and the second protrusion part so that the first engagement part 811 and the second engagement part 812 are engaged with the respective protrusion parts is also possible.

Further, although the example in which the multiple print element substrates 10 are arranged in the flow path member 210 is explained in the present embodiment, there is not a limitation as such, and, even on a single print element substrate, it is sufficient as long as drive elements are arranged in the arrow B direction.

Further, it is desirable that the linear expansion of the flow path member 210 is smaller than the linear expansion of the liquid ejection unit support member 81. The linear expansion of the flow path member 210 is made to be smaller than the linear expansion of the liquid ejection unit support member 81. Accordingly, it is possible to prevent the flow path member 210 from being thermally deformed more significantly than the liquid ejection unit support member 81, and it is possible to prevent the flow path member 210 from warping in the direction orthogonal to the arrow B direction.

Modification Example

Figure 10:
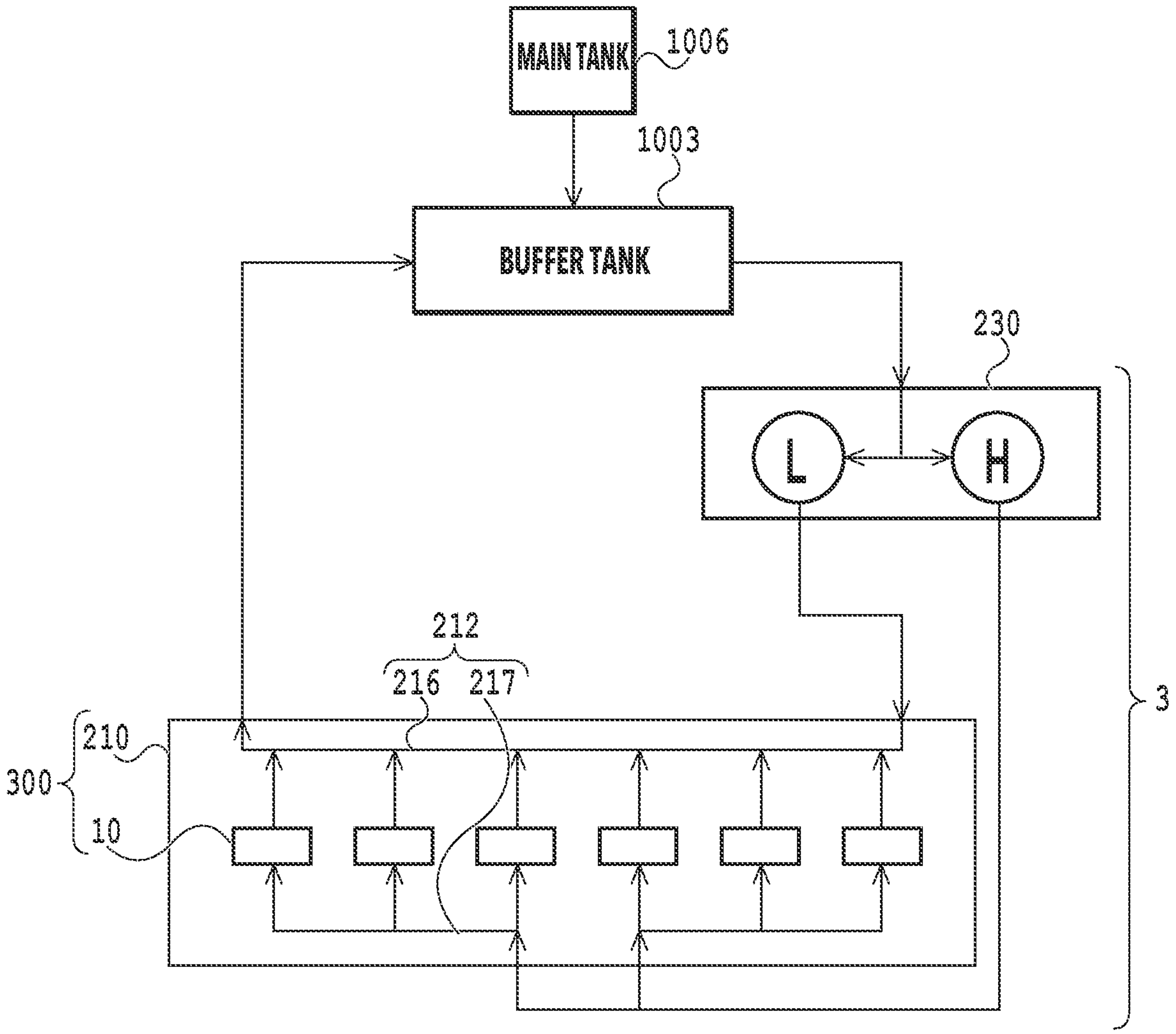
FIG. 10 is a diagram illustrating a circulation system of a modification example.

FIG. 10 is a diagram illustrating a circulation system of a modification example of the present embodiment. Other than the circulation path, such a circulation system having a circulation path passing through the print element substrates is also possible, as illustrated in FIG. 10.

In this way, in the liquid ejection head that ejects the circulating liquid, the second engagement part 812 formed on the discharge port 214 side has an elongated hole shape extending in the arrow B direction so as to support the liquid ejection unit support member 81 in such a manner capable of allowing the thermal deformation. Accordingly, it is possible to provide a liquid ejection head and liquid ejection apparatus capable of suppressing deterioration in image quality without adding a member for heat radiation.

Second Embodiment

Hereinafter, the second embodiment of the present invention will be explained with reference to the drawings. Note that the basic configurations of the present embodiment are the same as those of the first embodiment, and thus the characteristic configurations will be explained below.

Figure 11:
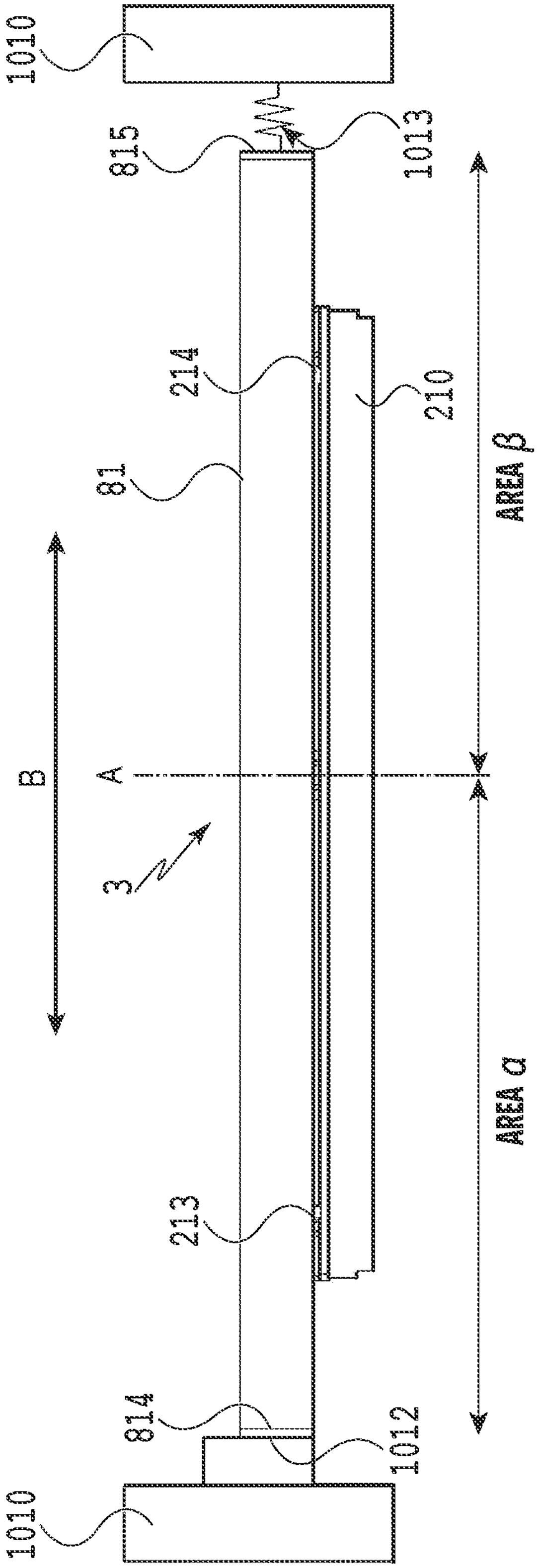
FIG. 11 is a schematic view illustrating a liquid ejection unit support part and a flow path member.

FIG. 11 is a schematic view illustrating the liquid ejection unit support member 81 and the flow path member 210 to which the present embodiment can be applied. The liquid ejection unit support member 81 in the present embodiment includes the abutting part 814 and the pressure-reception part 815 on the side surfaces with respect to the arrow B direction. Further, the liquid ejection head holding part 1010 includes the abutted part 1012 and the pressure-application member 1013. A pressure is applied by the pressure-application member 1013 to the pressure-reception part 815 of the liquid ejection unit support member 81, and the abutting part 814 is made to abut on the abutted part 1012, so that the liquid ejection head 3 is thereby fixed in such a manner of being restrained in the arrow B direction.

Here, the ejection center of the liquid ejection head 3 in the arrow B direction is the center position of the flow path member 210 of which the abutting part 814 is the reference. Further, in the arrow B direction, the supply port 213 is formed on the same side as the abutting part 814, and the discharge port 214 is formed on the same side as the pressure-reception part 815. Further, the area α, which is a low temperature area, is from the abutting part 814 of the liquid ejection unit support member 81 to the ejection center of the liquid ejection head 3, and the area β, which is a high temperature area, is from the ejection center of the liquid ejection head 3 to the pressure-reception part 815. With such a configuration, thermal deformation in the area α can also be suppressed and deviation between the ejection center and the center position of the print medium 2 can be suppressed, so that deterioration in the quality of images to be printed can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-159538 filed Sep. 29, 2021, which is hereby incorporated by reference herein in its entirety.

What is claimed is:

1. A liquid ejection head comprising:

a flow path member including an element substrate equipped with a plurality of ejection ports that eject a liquid and a common flow path capable of supplying the liquid to the element substrate and disposed along the element substrate arranged in a first direction; and a support member that supports the flow path member and is equipped with a supply port capable of supplying the liquid in the common flow path and a discharge port capable of discharging the liquid from the common flow path, wherein, in the liquid ejection head, the liquid circulates via the supply port, the common flow path, and the discharge port, wherein, in the support member, the supply port is formed in the vicinity of one end, and the discharge port is formed in the vicinity of the other end, wherein the support member includes a first fixation part that is installed in the vicinity of the one end to fix the one end to an apparatus and a second fixation part that is installed in the vicinity of the other end to fix the other end to the apparatus so as to be movable in the first direction, wherein the flow path member extends along the first direction and, with respect to the first direction, the entirety of the flow path member is disposed between locations on the support member where the first fixation part and the second fixation part are located, and wherein all of the plurality of ejection ports are disposed in the flow path member between locations on the support member, with respect to the first direction, where the supply port and the discharge port are located.

2. The liquid ejection head according to claim 1, wherein the flow path member is supported by the support member at a central part of the flow path member with respect to the first direction.

3. The liquid ejection head according to claim 1, wherein the second fixation part is a hole having an elongated hole shape extending in the first direction.

4. The liquid ejection head according to claim 3, wherein the second fixation part is fastened with a fastening member.

5. The liquid ejection head according to claim 3, wherein the second fixation part is engaged with a protrusion part.

6. The liquid ejection head according to claim 1, wherein the second fixation part has a pressure-reception part, where pressure is applied by a pressure-application member.

7. The liquid ejection head according to claim 1, wherein the flow path member has a linear expansion smaller than that of the support member.

8. The liquid ejection head according to claim 1, further comprising a circulation path that passes through the element substrate.

9. The liquid ejection head according to claim 1, further comprising a pressure-adjustment unit configured to adjust a pressure of the circulating liquid.

10. A liquid ejection apparatus comprising:

a flow path member including an element substrate equipped with a plurality of ejection ports that eject a liquid and a common flow path capable of supplying the liquid to the element substrate and disposed along the element substrate arranged in a first direction;

a support member that supports the flow path member and is equipped with a supply port capable of supplying the liquid in the common flow path and a discharge port capable of discharging the liquid from the common flow path; and a liquid ejection head in which the liquid circulates via the supply port, the common flow path, and the discharge port, wherein, in the support member, the supply port is formed in the vicinity of one end, and the discharge port is formed in the vicinity of the other end, wherein the support member includes a first fixation part that is installed in the vicinity of the one end to fix the one end to the apparatus and a second fixation part that is installed in the vicinity of the other end to fix the other end to the apparatus so as to be movable in the first direction, wherein the flow path member extends along the first direction and, with respect to the first direction, the entirety of the flow path member is disposed between locations on the support member where the first fixation part and the second fixation part are located, and wherein all of the plurality of ejection ports are disposed in the flow path member between locations on the support member, with respect to the first direction, where the supply port and the discharge port are located.

* * * * *